United States Patent [19]

Brooker

[11] 4,267,217
[45] May 12, 1981

[54] BALL

[76] Inventor: Bernard F. Brooker, Silver Birches Balcombe Rd., Crawley, Sussex, England

[21] Appl. No.: 77,153

[22] Filed: Sep. 19, 1979

Related U.S. Application Data

[62] Division of Ser. No. 973,596, Dec. 27, 1978, Pat. No. 4,203,941.

[51] Int. Cl.³ .................... A63B 37/02; A47G 33/04
[52] U.S. Cl. .................... 428/11; 273/58 A; 273/58 K
[58] Field of Search ............. 273/58 A, 58 K; 428/11

[56] References Cited

U.S. PATENT DOCUMENTS

| 2,805,067 | 9/1957 | Ryan | 273/58 K |
| 3,105,457 | 10/1963 | Krveger | 428/11 |
| 3,192,529 | 6/1965 | Chatelain | 428/11 |
| 3,222,065 | 12/1965 | Dwork | 273/58 K |
| 3,651,530 | 3/1972 | Schultz | 273/58 K |
| 3,691,704 | 9/1972 | Novak | 428/11 |

FOREIGN PATENT DOCUMENTS

| 715562 | 9/1931 | France | 273/58 A |
| 2007581 | 5/1979 | United Kingdom | 273/58 A |

Primary Examiner—William R. Dixon, Jr.
Attorney, Agent, or Firm—Toren, McGeady and Stanger

[57] ABSTRACT

In molding a ball consisting of a cover on a hard spherical core, e.g. a base ball, or a golf ball, one of the problems is maintaining accurate location of the core in the ball. According to the invention there is provided a molded shell for surrounding the core. The molded shell comprises a pair of half-shells clipped or adapted to be clipped together, and having a plurality of spaced projections extending substantially radially therefrom, with the tips of the projections located on an imaginary sphere concentric with the core.

3 Claims, 5 Drawing Figures

BALL

This is a division of application Ser. No. 973,596 filed Dec. 27, 1978, now U.S. Pat. No. 4,203,941.

This invention relates to balls, particularly for cricket or hockey.

In addition to cricket and hockey balls, the invention is also applicable to other types of ball with a casing and a hard core, such as balls for baseball, golf, rounders, stoolball and fives.

A hockey ball is similar to a cricket ball apart from colour and the other types of ball have other variants. When reference is made hereinafter to a cricket ball it is intended, where the context permits, that this term should include a hockey ball and balls of the other types mentioned.

A traditional cricket ball has a core of cork pieces and twine, hand-rolled into a sphere and covered with a hand-sewn leather cover which is polished to a deep gloss. This type of ball is prohibitively expensive for all but a relatively restricted use and many cheaper substitutes are known and used. However, most neither feel, look nor have in use like traditional cricket balls. One recent approach has been to slush mould a cover onto a core. In this procedure pins are pushed into the core to support the latter in the mould while the cover material, e.g., polyvinylchloride or like elastomer material is poured into the mould. After the cover has set the pins are removed. The main problem with this procedure is that of ensuring concentricity of the core in the mould. Any eccentricity leads to variations in the thickness of the cover, which may lead to localised softness or cracking, and also to degree of bias in the finished ball, which is undesirable and possibly dangerous in view of its unpredicability.

According to the invention of co-pending related application Ser. No. 973,596, there is provided a method of making a ball comprising the steps of enclosing a preformed spherical core in a preferred supporting shell provided with a plurality of spaced projections extending substantially radially therefrom with the tips co-spherical, supporting the core and a shell in a spherical mould by means of the said projections and moulding a covering material over the core and shell.

The supporting shell may be formed of two half shells, conveniently identical, having inter-engaging formations so as to clip together.

The covering material is preferably injection moulded over the core and shell.

The supporting shell is preferably provided with apertures so that any small gaps between the shell and the core may be filled with covering material during the moulding step.

According to the present invention, there is provided a supporting shell for fitting over a spherical core comprising a pair of half-spherical shells clipped or adpated to be clipped together, and having a plurality of spaced projections extending substantially radially therefrom with the tips located on an imaginary sphere concentric with the core.

The invention will be further described with reference to the accompanying drawings which illustrate a preferred form of the invention and in which.

Figure 1:
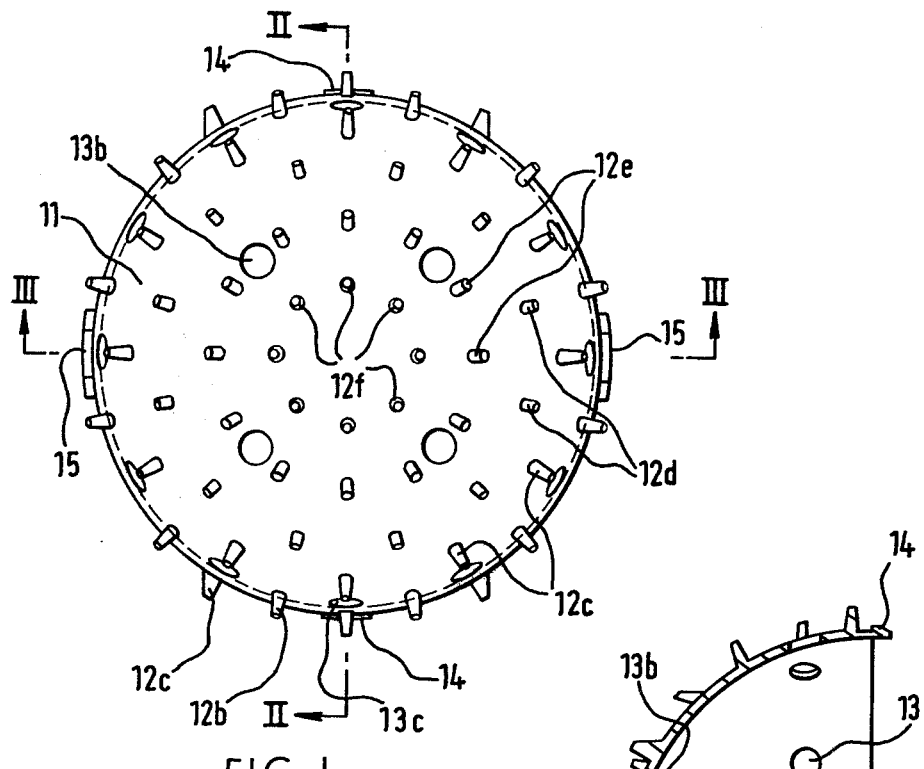
FIG. 1 is a elevation of a preferred form of half shell for a supporting shell.
Figure 2:
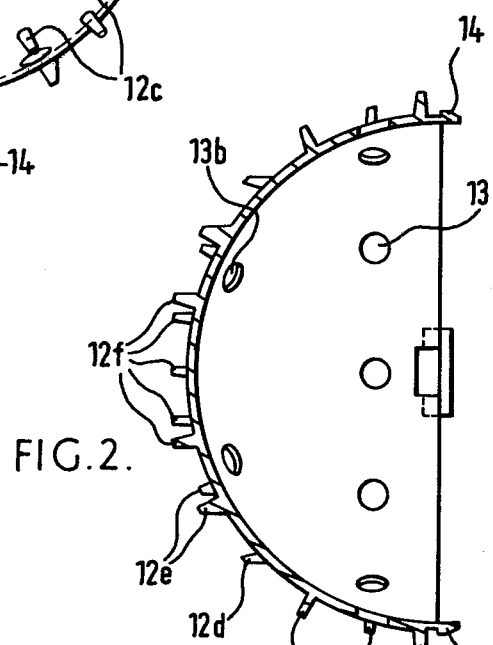
FIG. 2 is a section on the line II—II of FIG. 1.
Figure 3:
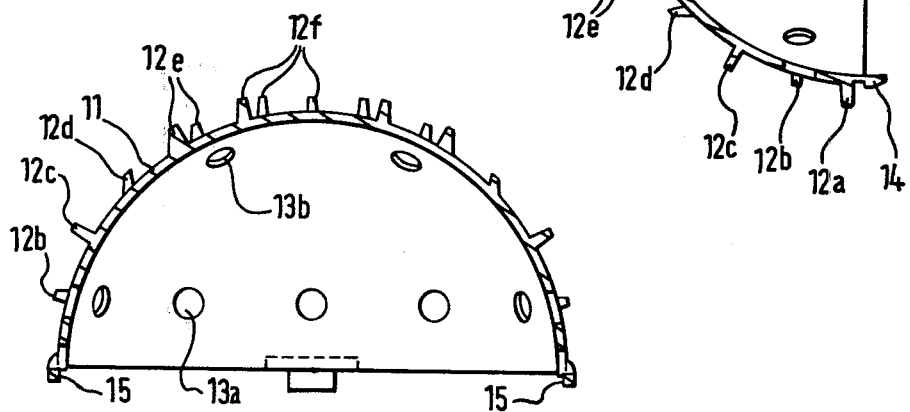
FIG. 3 is a section on the line III—III of FIG. 1.

Turning first to FIGS. 1 to 3, there is shown a half shell 11 moulded in nylon 66 or similar material and being of hemi-spherical form. The outer surface of the half shell 11 is provided with six rows of projections 12a to 12f respectively. All the projections terminate substantially on an imaginary sphere, i.e. with a tolerance of the order of 0.2 mm, since the projections are designed to support the shell centrally in a spherical mould. The shape of the projections, particularly in rows of 12c, is designed for each of draw-off after moulding. There are also two rows of circular apertures 13a and 13b. To clip the half-shell 11 to a similar half shell, each is provided with a pair of hooks 14 and a pair of lips 15 for interengagement with the lips 15 and hooks 14 of the matching similar half shell respectively.

Figure 4:
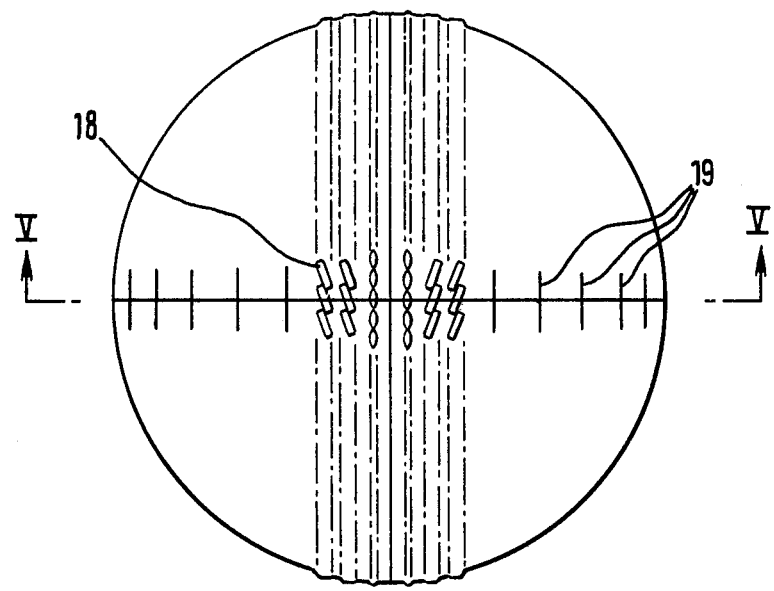
FIG. 4 is an elevation of a completed ball.

In the manufacture of a cricket ball according to a preferred mode of the invention, a pair of half shells 11 are clipped together over a spherical core 16 (see FIG. 5) made by moulding cork chippings and rubber together and the assembly of core 16 and half shells 11, which together form a supporting shell for the core, is supported concentrically in a spherical injection mould cavity by means of the projections 12a to 12f. An outer casing material, e.g. polyvinylchloride having a Shore hardness of about 75, is then injected into the mould to form a casing 17. In order to give an appearance and physical characteristics similar to those of a conventional cricket ball, the mould cavity may be produced by an electro-forming or photo-etching process using a conventional hand-made ball as a master. It can be seen from FIGS. 4 and 5 that the conventional seam is reproduced at 18 and the surface also takes on a leather grain texture and has reproduced the witness lines 19 of a hand-made leather cover. For a cricket ball, the ball will have a highly polished red finish, and a hockey ball will be white. Alternative characteristic surface formations will be reproduced on other types of ball.

Figure 5:
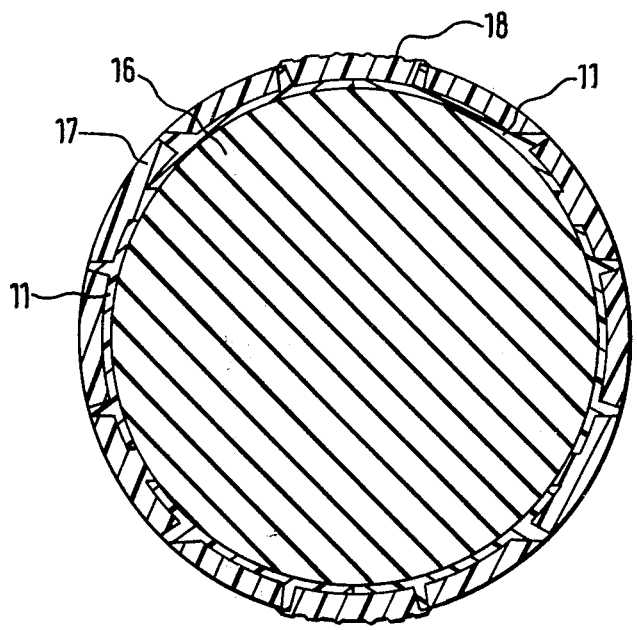
FIG. 5 is a section on the line V—V of FIG. 4.

Various modifications may be made within the scope of the invention. For instance, the half-shells 11 could be moulded of the same material, e.g. polyvinylchloride composition of appropriate hardness, as the casing 17. The shell and casing would then fuse into a substantially integral unit during moulding, and possible problems arising from poor bonding between the shells and the casing would be avoided. The boundary lines between these parts, as shown in FIG. 5, would then be indiscernible, except possibly in a microscopic or other laboratory examination.

I claim:

1. A supporting shell for fitting over a spherical core comprising a pair of half-spherical shells clipped or adapted to be clipped together, and having a plurality of spaced projections extending substantially radially therefrom with the tips located on an imaginary sphere concentric with the core.

2. A shell as claimed in claim 1, in which the half shells are identical.

3. Apparatus adapted to be operatively utilized within molding means for manufacturing a ball comprising a supporting shell formed from a plurality of shell members, means for clipping said shell members together to form said supporting shell and to effect fitting of said supporting shell over a spherical core, and a plurality of spaced projections extending substantially radially from said supporting shell with said radial projections having terminal tips located on an imaginary sphere concentric with said core.

* * * * *